United States Patent
Tsubota (10) Patent No.: US 7,782,769 B2
(45) Date of Patent: Aug. 24, 2010

(54) ACCESS CONTROL DEVICE, WIRELESS DEVICE, AND NETWORK

(75) Inventor: Azuma Tsubota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 713 days.

(21) Appl. No.: 11/707,872

(22) Filed: Feb. 20, 2007

(65) Prior Publication Data

US 2007/0274211 A1 Nov. 29, 2007

(30) Foreign Application Priority Data

May 26, 2006 (JP) .............................. 2006-146639

(51) Int. Cl.
*H04J 1/16* (2006.01)

(52) U.S. Cl. ....................... 370/229; 370/230; 370/236; 370/237; 370/331; 370/338; 455/453

(58) Field of Classification Search ................. 370/229, 370/230, 230.1, 231, 232, 233, 234, 235, 370/235.1, 236, 236.1, 236.2, 237, 238, 312; 455/405, 410, 412.2, 420, 445, 453

See application file for complete search history.

(56) References Cited

U.S. PATENT DOCUMENTS

| | | | | |
|---|---|---|---|---|
| 6,628,632 B1 * | 9/2003 | Dolan | .......................... | 370/332 |
| 7,221,945 B2 * | 5/2007 | Milford et al. | ............ | 455/452.1 |
| 7,406,319 B2 * | 7/2008 | Kostic et al. | ................. | 455/453 |
| 7,522,518 B1 * | 4/2009 | Satapathy | .................... | 370/229 |
| 2006/0262767 A1 * | 11/2006 | Peleg et al. | .................. | 370/338 |

FOREIGN PATENT DOCUMENTS

| | | |
|---|---|---|
| JP | 2001-237856 | 8/2001 |
| JP | 2003-032267 | 1/2003 |
| JP | 2004-254028 | 9/2004 |
| JP | 2004-304648 | 10/2004 |
| JP | 2005-012724 | 1/2005 |

* cited by examiner

*Primary Examiner*—Kent Chang
*Assistant Examiner*—Magdi Elhag
(74) *Attorney, Agent, or Firm*—Rabin & Berdo P.C.

(57) ABSTRACT

An access control device is provided to a wireless device of a network which is constituted with a plurality of wireless devices connecting with one or a plurality of wireless terminals. The access control device includes: a connection severance terminal selection section which, when a bandwidth employed by a wireless communications section exceeds a threshold, selects a terminal whose connection is to be cut off from among the wireless terminals; a connection severance declaration section which, sends a connection severance declaration message to the other wireless terminals, including information about the connection severance terminal; and a forcible severance instruction section which verifies reception, of a message of declaration of acceptance of the connection severance terminal, and causes a forcible severance instruction message for the connection severance terminal. Accordingly, connection points of the wireless terminals can be efficiently changed in order to assure communication quality at the wireless devices.

18 Claims, 5 Drawing Sheets

ACCESS CONTROL DEVICE, WIRELESS DEVICE, AND NETWORK

CROSS-REFERENCE TO RELATED APPLICATION

This application claims priority under 35 USC 119 from Japanese Patent Application No. 2006-146639, the disclosure of which is incorporated by reference herein.

BACKGROUND OF THE INVENTION

1. Field of the Invention

The present invention relates to an access control device, a wireless device and a network, and is applicable to an access control device which assures communication quality at a wireless device on a network which is structured to include a plurality of wireless devices connecting with wireless terminals, to the wireless device equipped with this access control device, and to the network.

2. Description of the Related Art

Heretofore, at, for example, a wireless LAN access point according to an IEEE 802.11 specification, communications are carried out by 'best effort'. Consequently, when performing real-time communications such as VoIP communications or the like, a bandwidth which is necessary to assure communication quality may not be obtained, which is a cause of a deterioration in quality.

In response to this problem, IEEE 802.11e has been established as a standard for assuring communication quality (quality of service, QoS), and assurance of communication quality is carried out in accordance therewith.

Under IEEE 802.11e, in order to support QoS, an access control procedure which extends the MAC layer has been standardized. As this access control procedure, an HCF (hybrid coordination function) function is prescribed. This HCF is a function integrated combining the functions of DCF (distributed coordination function), which is a conventional autonomous distributed access control procedure, and PCF (point coordination function), which is a centralized control section employing polling. HCF is principally divided into an HCF competitive channel access control format and an HCF controlled channel access control format.

The HCF competitive channel access control format is an improvement of the previous CSMA/CA procedure, categorizes transmission frames into categories in accordance with service quality, and applies priority control with differentials based on the service qualities of the respective categories.

The HCF controlled channel access control format is a procedure which extends conventional PCF, enables negotiations about communication quality between access points and terminals prior to data transfers and, in order to implement scheduling in consideration of predetermined qualities in accordance with data types when performing polling for data transfers, guarantees parameters such as a specified bandwidth, delay period and the like.

An example of a previously known technology is Japanese Patent Application Laid-Open (JP-A) No. 2004-304648.

As a number of connected client terminals become larger, sharing communication bandwidth between access points becomes complicated, and maintaining communication quality becomes difficult. In particular, assuring communication quality for access points that are performing communications which require real time behavior, such as VoIP communications, is strongly desired.

In such a case, ordinarily, a number of access point devices are increased, connections of client terminals which are currently connected are temporarily cut off, and those client terminals are caused to communicate with other access points using different channels.

However, a method to determine which access point a client terminal should be connected with when transferred to a connection with another access point is not standardized in IEEE 802.11. Therefore, if access points are implemented with the above-described standards technology of IEEE 802.11e as it is, a situation arises in which a client terminal will connect to only one of a plurality of access points, because of specifications of the client terminal (for example, a specification relating to networks which the client terminal requests connection to), variations in electromagnetic wave quality from fabrication of the access points, communications channels of the access points and suchlike, and a problem occurs with regard to communication quality at the one access point.

Therefore, in order to assure communication quality at access points (wireless devices), an access control device, wireless device and network are sought which can share out transfer destinations of client terminals (wireless terminals) assigned to the access points (wireless devices), can efficiently utilize an overall communication bandwidth of a network system, and can make communication volumes of respective usable wireless channels uniform.

SUMMARY OF THE INVENTION

In order to solve the current problem, an access control device of a first aspect of the present invention is an access control device to be provided to a wireless device of a network, the wireless device connecting with one or a plurality of wireless terminals and the network being constituted to include a plurality of the wireless device, and the access control device including: (1) an inter-device communications section which communicates with each other wireless device; (2) a wireless communications section which communicates wirelessly with each of the wireless terminals; (3) an employed bandwidth monitoring section which monitors bandwidth employed by the wireless communications section; (4) a connection severance terminal selection section which, if the bandwidth employed by the wireless communications section exceeds a threshold, selects a connection severance terminal from among the wirelessly communicating wireless terminals; (5) a connection severance declaration section which, when the connection severance terminal is selected, causes a connection severance declaration message to be sent to each other wireless terminal via the inter-device communications section, the connection severance declaration message including information about the connection severance terminal; and (6) a forcible severance instruction section which verifies reception, via the inter-device communications section, of a message of declaration of acceptance of the connection severance terminal from another of the wireless devices, and causes a forcible severance instruction message to be sent to the connection severance terminal.

A second aspect of the present invention is an access control device to be provided to a wireless device of a network, the wireless device connecting with one or a plurality of wireless terminals and the network being constituted to include a plurality of the wireless device, and the access control device including: (1) an inter-device communications section which communicates with each other wireless device; (2) a wireless communications section which communicates wirelessly with each of the wireless terminals; (3) an acceptance judgment section which judges whether or not to connect with a connection severance terminal on the basis of connection severance terminal information included in a connection severance declaration message from another of the wireless devices, which the inter-device communications section has received; and (4) an acceptance declaration section which, if connection with the connection severance terminal is accepted by the acceptance judgment section, causes a message of declaration of acceptance of the connection severance terminal to be sent to other wireless device via the inter-device communications section.

A wireless device of a third aspect of the present invention is a wireless device of a network that is constituted to include a plurality of the wireless device, the wireless device connecting with one or a plurality of wireless terminals, and the wireless device including an access control device of the first or second aspect of the present invention.

A network of a fourth aspect of the present invention is constituted to include a plurality of the wireless device of the third aspect of the present invention, each wireless device connecting with one or a plurality of wireless terminals.

According to the present invention, in order to assure communication quality of a wireless device, transfer destinations of wireless terminals assigned to the wireless device can be shared out, an overall communication bandwidth of a network system can be efficiently utilized, and communication volumes at respective available wireless channels can be made uniform.

BRIEF DESCRIPTION OF THE DRAWINGS

Preferred exemplary embodiments of the present invention will be described in detail based on the following figures, wherein.

DETAILED DESCRIPTION OF THE INVENTION

(A) First Embodiment

Herebelow, a first embodiment embodying an access control device, wireless device and network of the present invention will be described with reference to the drawings.

For the first embodiment, a mode of a case in which the access control device of the present invention is employed at an access point structuring a wireless network which uses an infrastructure mode will be described.

(A-1) Structure of the First Embodiment

Figure 2:
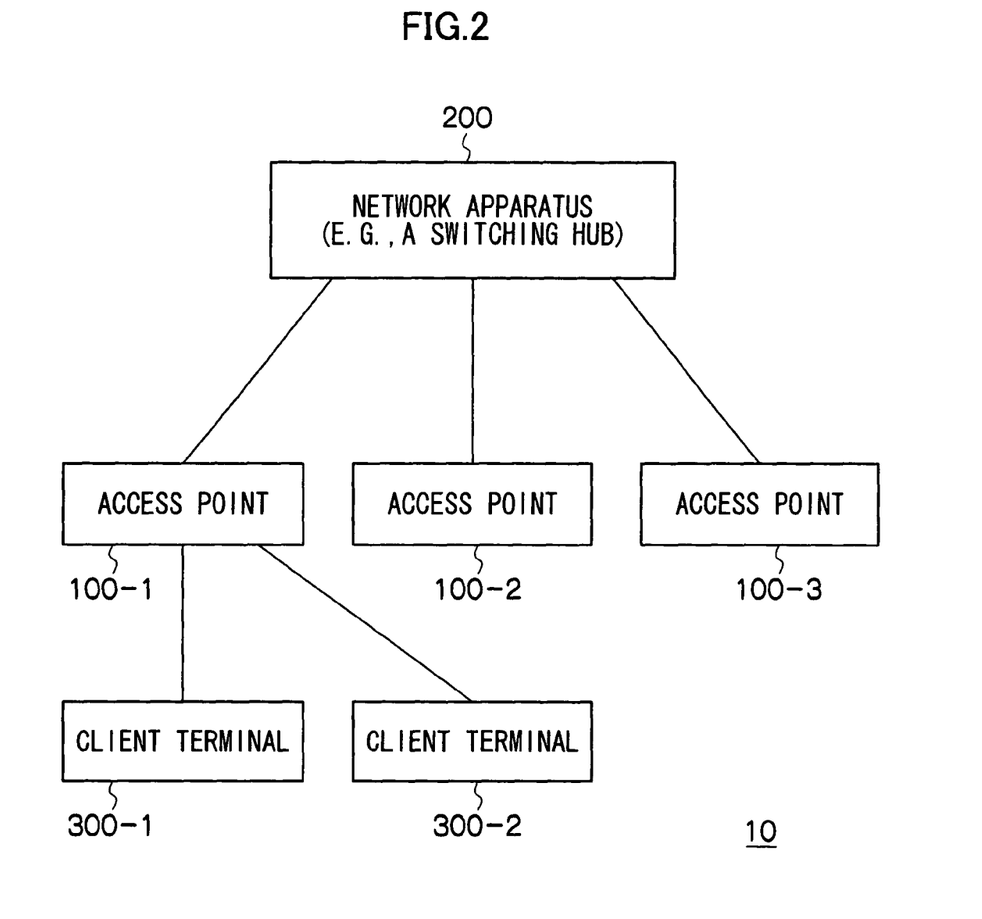
FIG. 2 is a diagram showing overall constitution of a network relating to the first embodiment.

FIG. 2 is a structural diagram showing structure of a network relating to the present embodiment. As shown in FIG. 2, a network 10 of the present embodiment is structured to include at least a plurality (two in FIG. 2) of client terminals 300 (300-1 and 300-2) which are operated by users, a plurality (three in FIG. 2) of access points 100 (100-1 to 100-3) which connect wirelessly with the client terminals 300-1 and 300-2, and a network apparatus 200 which connects the respective access points 100 by wired connections.

The network 10 of the present embodiment as shown in FIG. 2 uses an infrastructure mode for the access points 100 to connect wirelessly with the client terminals 300 that are disposed within range of electromagnetic waves.

In FIG. 2, a state is shown in which the client terminals 300-1 and 300-2 are in the range of electromagnetic waves of the access point 100-1, and the access point 100-1 has connected wirelessly with the client terminals 300-1 and 300-2.

The access points 100-1 to 100-3 are connected with the network apparatus 200 via wiring connections, and perform exchanges of information with the other access points via the network apparatus 200.

Now, the network apparatus 200 implements information transfers between the access points 100-1 to 100-3 through the wired connections. As long as the network apparatus 200 is a network apparatus capable of information transfers between the access points 100-1 to 100-3, for example, widely used switching hubs, routers and the like can be employed. Here, although not shown in FIG. 2, the network apparatus 200 may constitute a wired LAN to which other relay devices, servers and the like are connected by wired connections.

The access points 100-1 to 100-3 send beacon signals at predetermined intervals, to notify the client terminals 300 that are present in a wireless cell (a range of electromagnetic waves).

The access points 100-1 to 100-3 are equipped with standard functions of a MAC layer of a wireless LAN, in conformance with IEEE 802.11, and implement access control for the client terminals 300, management between the client terminals 300, and suchlike.

Here, the access points 100-1 to 100-3 may employ, for example, CSMA/CA (Carrier Sense Multiple Access with Collision Avoidance) as an access control function. Further, the access points 100-1 to 100-3 include authentication functions and connection functions for the client terminals 300, which implement authentication processing and connection processing with the client terminals 300 in accordance with request messages received from the client terminals 300 (for example, probe request messages, authentication request messages, association request messages and the like), as well as power management state administration functions for the client terminals 300 and so forth.

Further, when authentication and connection of the client terminals 300 has been completed, the access points 100-1 to 100-3 establish wireless communications between the client terminals 300.

Figure 1:
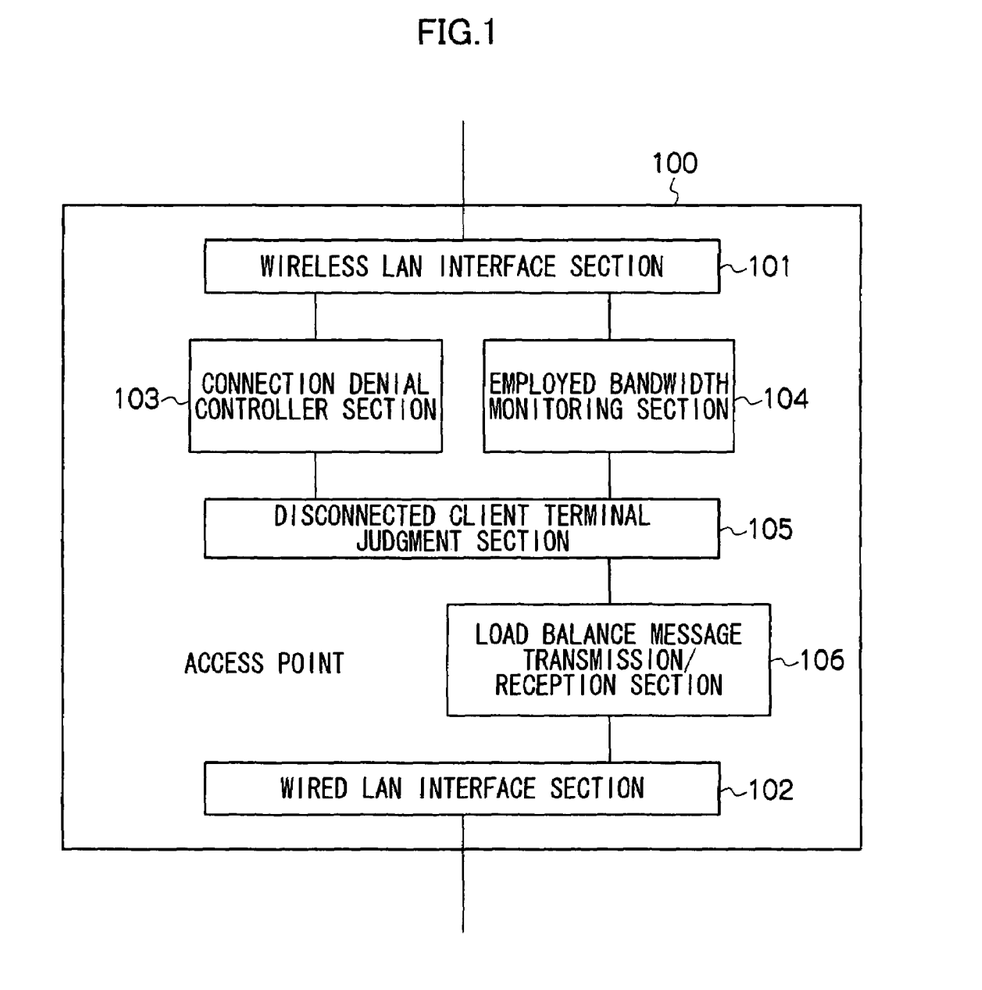
FIG. 1 is a block diagram showing internal structure of an access point relating to a first embodiment.

FIG. 1 is a block diagram showing principal internal structures of the access point 100 relating to the present embodiment.

As shown in FIG. 1, the access point 100 of the present embodiment is principally provided with a wireless LAN interface section 101, a wired LAN interface section 102, a connection denial controller section 103, an employed bandwidth monitoring section 104, a severance client terminal judgment section 105, and a load balance message transmission/reception section 106.

The wireless LAN interface section 101 is an ordinary wireless LAN interface section which operates in an infrastructure mode conforming to IEEE 802.11, and transmits and receives signals to and from the client terminals 300 using predetermined wireless channels, according to a channel access control format based on CSMA/CA.

The wireless LAN interface section 101 receives a MAC address of a client terminal 300 for which connection is to be refused, from the connection denial controller section 103, and restricts connection processing with the client terminal 300 with this MAC address. That is, when the wireless LAN interface section 101 receives probe request messages, authentication request messages and the like from the client terminal 300 with such a MAC address, the wireless LAN interface section 101 will not implement responses with probe response messages, authentication response messages and the like.

The wired LAN interface section 102 is an interface section for sending and receiving information to and from wired connections that are connected therewith. A previous wired network interface section can be employed as the wired LAN interface section 102.

The employed bandwidth monitoring section 104 is for monitoring a communication bandwidth that the wireless LAN interface section 101 is currently employing. At the employed bandwidth monitoring section 104, a load balance function commencement threshold is specified beforehand. The employed bandwidth monitoring section 104 senses when the communication bandwidth currently being used by the wireless LAN interface section 101 exceeds the load balance function commencement threshold, and notifies the severance client terminal judgment section 105 of such an occurrence. Hence, in order to maintain communication quality, the client terminal 300 and the access point 100 can commence processing relating to a connection denial for the client terminals 300 that are currently connected.

In the present embodiment, the employed bandwidth is monitored. However, it is also possible to monitor a number of communications with the access point, and when the number of communications exceeds a threshold value, to give notice of that occurrence.

When the severance client terminal judgment section 105 receives a notification from the employed bandwidth monitoring section 104, indicating that the bandwidth employed by the wireless LAN interface section 101 has exceeded the load balance function commencement threshold, the severance client terminal judgment section 105 selects a client terminal 300 for which connection is to be cut off from among the client terminals 300 that are currently connected, by a predetermined selection method, and supplies the MAC address of the selected client terminal 300 to the load balance message transmission/reception section 106. Thus, the access point 100, in order to assure communication quality, can select a candidate from the client terminals 300 for connection denial.

The load balance message transmission/reception section 106 creates a forcible disconnection scheduling message, known as a deauthentication scheduling message, which includes the MAC address of the client terminal 300 received from the severance client terminal judgment section 105, and a wireless channel (wireless channel number) and SSID (service set identifier) which the client terminal 300 is employing for wireless communications. The load balance message transmission/reception section 106 transmits this deauthentication scheduling message as an IP packet from the wired LAN interface section 102, for broadcasting or multicasting. Thus, the access point 100 can give notice of information relating to the client terminal 300 that is to be forcibly disconnected to other, neighboring access points 100 via wired connections.

The load balance message transmission/reception section 106 of another of the access points 100 receives the IP packet containing the deauthentication scheduling message from the access point 100 which is implementing a connection denial of a client terminal 300 that is connected thereto. This other access point 100 judges matching with the SSID included in the received deauthentication scheduling message, and then judges whether or not the wireless channel at the access point 100 that is the source of transmission of the IP packet coincides with wireless channels at this access point 100.

Then, if the wireless channels do not coincide, this access point 100 performs preparation for a reconnection with the client terminal 300 that is the object of connection denial at the transmission origin (i.e., a switching of the connection). In order to give notice of this, the load balance message transmission/reception section 106 instructs the wired LAN interface section 102 requesting transmission of a 'ready' message. Thereafter, by authentication and connection processing between the wireless LAN interface section 101 and the client terminal 300 that is the object of the connection denial, an association is achieved, and the load balance message transmission/reception section 106 instructs the wired LAN interface section 102 requesting transmission of a 'complete' message by broadcasting or multicasting.

On the other hand, if the wireless channels coincide, the other access point 100 does not begin preparation for connection with the client terminal 300 that is the object of the connection denial but the load balance message transmission/reception section 106 instructs the connection denial controller section 103 to deny connection with that client terminal 300.

When this access point 100 receives the 'complete' message through a wired connection from the other access point 100 which is implementing reconnection with the client terminal 300, the load balance message transmission/reception section 106 cancels the denial of connection with the client terminal 300.

The connection denial controller section 103 is a section which gives notice to the wireless LAN interface section 101 of the MAC address of the client terminal 300 that is to be denied connection.

(A-2) Operation of the First Embodiment

Next, operation of the access point 100 of the present embodiment will be described with reference to the drawings. The access point 100 operates with the functions of a usual, previously known access point and, in addition to such usual operations, performs operations of the present embodiment which are described below.

Herebelow, operation at the access point 100-1 of FIG. 2 for, in order to maintain communication quality, cutting off the connection of any client terminal from among the client terminals 300 that are currently connected, and operation at the other access points 100-2 and 100-3 in neighboring positions for performing connection processing with the client terminal 300 whose connection has been cut off will be described.

Figure 3:
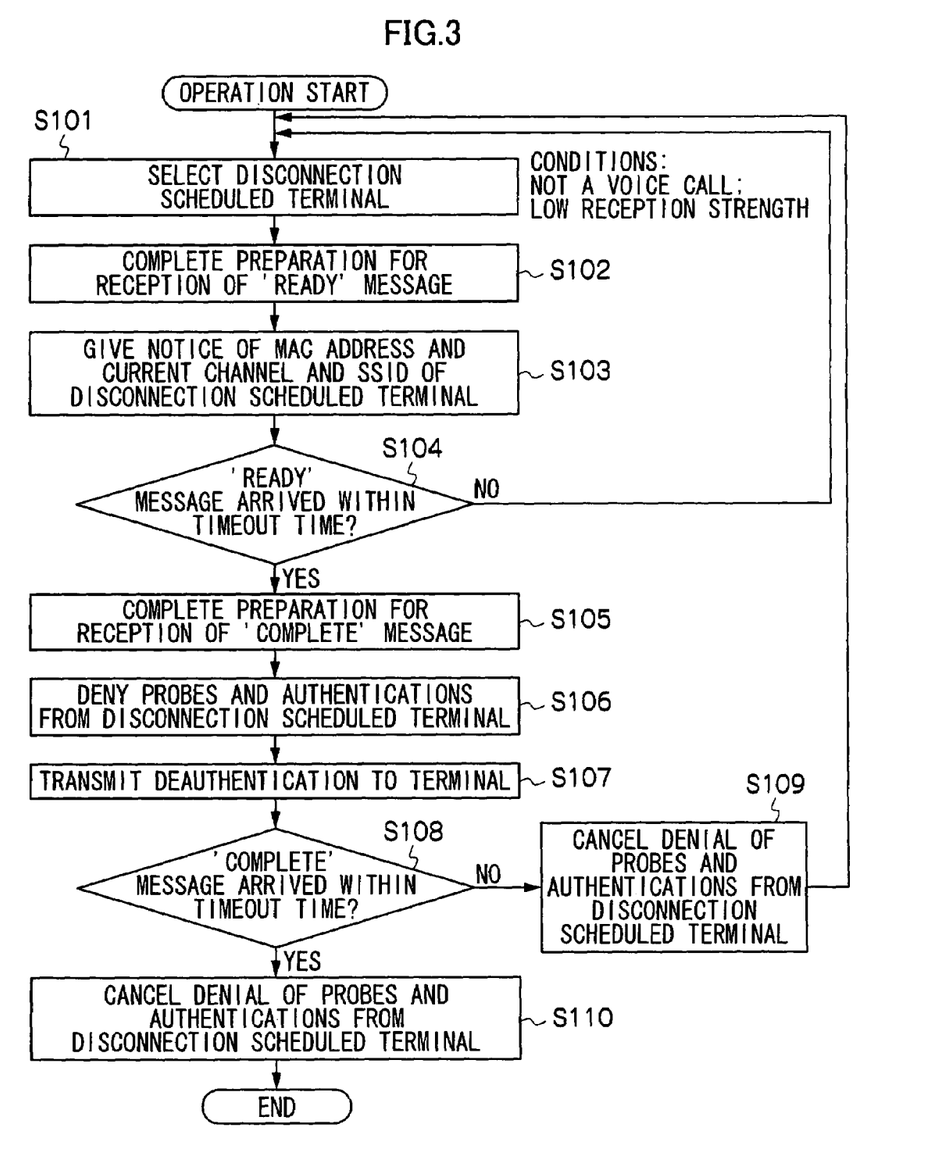
FIG. 3 is a flowchart showing operation of the access point relating to the first embodiment.

FIG. 3 is a flowchart showing the operation by the access point 100 for cutting off the connection of the client terminal 300. In the access point 100 relating to the present embodiment, the load balance function commencement threshold is specified in advance, by operation by a user or the like.

The access point 100-1 shown in FIG. 2 has been wirelessly connected with the client terminals 300-1 and 300-2 by an access control procedure relating to a previously known wireless LAN.

At the access point 100-1 to which the plural client terminals 300-1 and 300-2 are connected, the employed bandwidth monitoring section 104 continuously monitors the communication bandwidth that the wireless LAN interface section 101 is currently using.

When the employed bandwidth that the wireless LAN interface section 101 is using exceeds the pre-specified load balance function commencement threshold, the employed bandwidth monitoring section 104 notifies the severance client terminal judgment section 105 of that occurrence.

When the notification from the employed bandwidth monitoring section 104 that the load balance function commencement threshold has been exceeded is provided to the severance client terminal judgment section 105, the severance client terminal judgment section 105 selects, from among the client terminals 300-1 and 300-2 to which the wireless LAN interface section 101 is currently connected, the client terminal 300 with the lowest reception strength of electromagnetic waves, and notifies the wired LAN interface section 102 of the MAC address of the selected client terminal 300 (step S101).

At this time, in order to assure communication quality, the severance client terminal judgment section 105 may exclude any of the client terminals 300 that are implementing voice communications in selecting the object of disconnection.

When the load balance message transmission/reception section 106 receives the MAC address of the client terminal 300 that has been selected by the severance client terminal judgment section 105, the load balance message transmission/reception section 106 creates a deauthentication scheduling message including the notified MAC address, the wireless channel that the wireless LAN interface section 101 is using, and the SSID. The load balance message transmission/reception section 106 forms the thus-created deauthentication scheduling message as an IP packet, and sends this IP packet from the wired LAN interface section 102 as broadcast or multicast data (step S103).

Then, the load balance message transmission/reception section 106 waits for the arrival through the wired LAN interface section 102 of a receiving capability message (hereafter referred to as a 'ready' message) which is sent from another of the access points, until a timeout (step S 102).

If a 'ready' message arrives from another of the access points 100 before the timeout, the load balance message transmission/reception section 106 performs processing from step SI 05, which sends a load balance destination found message to the severance client terminal judgment section 105, onward (step S104).

On the other hand, if a 'ready' message does not arrive before the timeout, a load balance destination not-found message is sent to the severance client terminal judgment section 105, and the severance client terminal judgment section 105 returns to step S101, returning to processing for selection of the client terminal 300 with the second lowest reception strength of electromagnetic waves (step S104).

In step S105, the load balance message transmission/reception section 106 gives notice of the MAC address of the client terminal that is to be cut off to the connection denial controller section 103, and at the same time, commences preparation for reception of a load balance function operation completion message (a 'complete' message) at the load balance message transmission/reception section 106 (step S105).

The connection denial controller section 103 gives notice to the wireless LAN interface section 101 to ignore all probe request messages and authentication request messages from that MAC address (step S106), and outputs to the wireless LAN interface section 101 a deauthentication request message for the terminal with that MAC address (step S 107).

If the 'complete' message does not arrive before a timeout, the connection denial controller section 103 cancels the denial of probe request messages and authentication request messages at the wireless LAN interface section 101 (step S109), and then the processing returns to step S101 and performs processing for selecting another client terminal. Thus, if it is judged that the client terminal 300 which is scheduled to be disconnected cannot find an access point to connect to next, the disconnection of this client terminal 300 is abandoned and another of the client terminals 300 can be selected.

On the other hand, if a 'complete' message arrives before the timeout, the connection denial controller section 103 cancels the denial of probe request messages and authentication request messages at the wireless LAN interface section 101, and response messages (probe response message and authentication response message) will be returned (step S110).

Next, operation of the other access points 100-2 and 100-3 with spare bandwidth which are disposed neighboring the access point 100-1 will be described with reference to FIG. 4.

Figure 4:
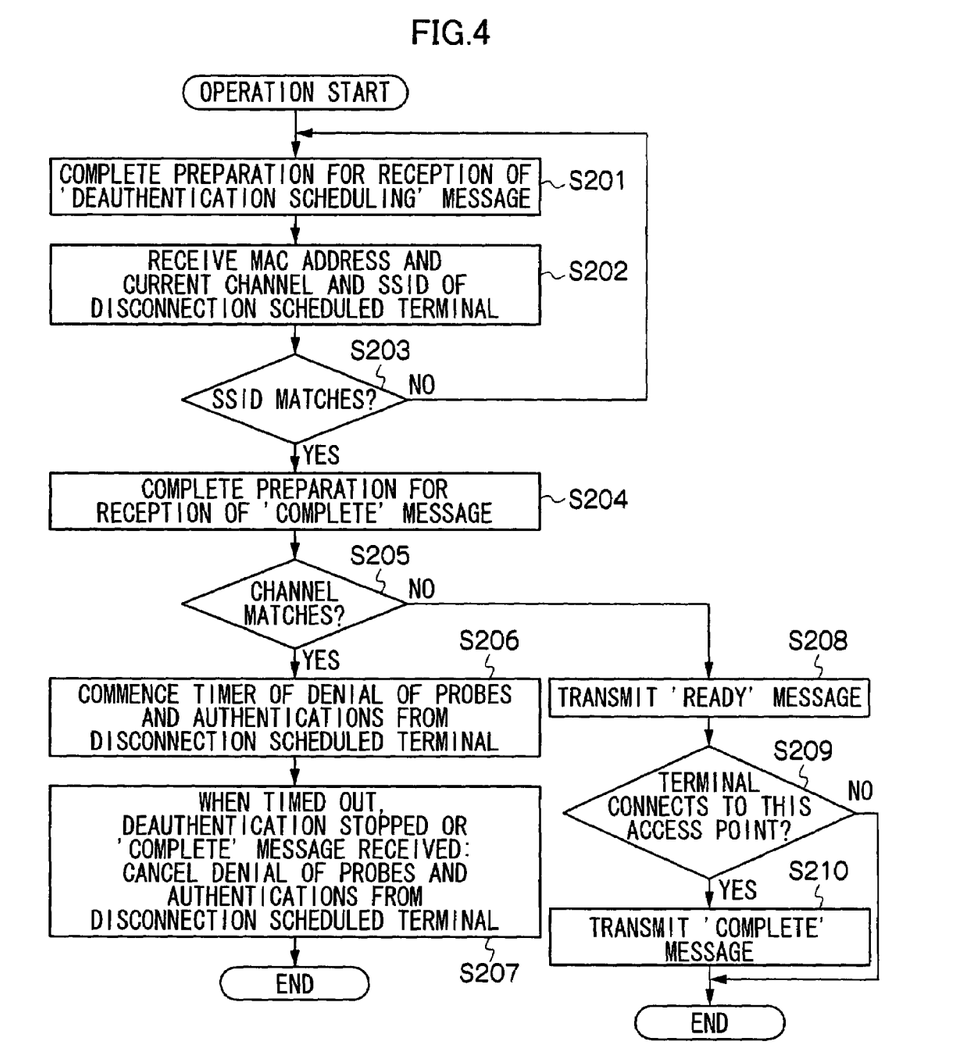
FIG. 4 is a flowchart showing operation of the access point relating to the first embodiment.

In FIG. 4, the load balance message transmission/reception section 106 performs preparation for reception of a deauthentication scheduling message through the wired LAN interface section 102 (step S201).

When the wired LAN interface section 102 receives the deauthentication scheduling message sent by the above-described other access point 100-1, the load balance message transmission/reception section 106 extracts the MAC address, wireless channel and SSID included in the deauthentication scheduling message that is received (step S202), and informs the connection denial controller section 103 of the extracted MAC address and wireless channel.

At this time, the load balance message transmission/reception section 106, using the SSID included in the deauthentication scheduling message, judges matching with the SSID of the current access point 100, and determines a network to which the particular client terminal 300 is connected. Hence, if the SSIDs are the same, the processing advances to step S204, and if the SSIDs are not the same, the processing returns to step S201 and the load balance message transmission/reception section 106 waits for reception of another deauthentication scheduling message (step S203).

In step S204, preparation for reception of a 'complete' message at the wired LAN interface section 102 is implemented by the load balance message transmission/reception section 106 (step S204).

The connection denial controller section 103 judges whether the wireless channel notified from the load balance message transmission/reception section 106 is the same as a channel employed by the wireless LAN interface section 101 (step S205).

Then, if it is judged that there is a matching wireless channel, the connection denial controller section 103 instructs the wireless LAN interface section 101 not to respond to any probe request message or authentication request message from the MAC address included in the deauthentication scheduling message. The wireless LAN interface section 101 receives this instruction and, of probe request messages and authentication request messages that are received, does not return response messages to request messages of which the transmission source is that MAC address (step S206). At this time, the access point 100 commences a timer operation for waiting for reception of a 'complete' message.

That is, if there is a matching wireless channel, the access point 100 functions so as not to carry out connection processing with the particular client terminal 300.

On the other hand, if it is judged that there is not a matching wireless channel, the connection denial controller section 103 makes a request for transmission of a 'ready' message to the load balance message transmission/reception section 106. The load balance message transmission/reception section 106 receives this request and causes a 'ready' message to be transmitted from the wired LAN interface section 102 (step S208).

That is, if the wireless channels differ, the access point 100 functions so as to perform connection processing with the particular client terminal 300.

When it is judged in step S205 that the wireless channels differ, connection processing with the client terminal 300 is carried out, and when the client terminal has achieved an association with the wireless LAN interface section 101 (step S209), the load balance message transmission/reception section 106 creates a 'complete' message, and transmits the 'complete' message from the wired LAN interface section 102 by broadcasting or multicasting (step S210).

On the other hand, if it is judged in step S205 that the wireless channels match, connection with the client terminal 300 is denied. When there is a detection of reception of a 'complete' message from another of the access points 100 within a predetermined time period, or a timeout, the connection denial controller section 103 cancels the denial of connection with the particular client terminal 300, and recommences responses to probe request messages and authentication request messages at the wireless LAN interface section 101 (step S207).

Next, operations among the access points 100-1 to 100-3 which are executing the processing shown in FIG. 3 and FIG. 4 will be described with reference to the sequence of FIG. 5.

Figure 5:
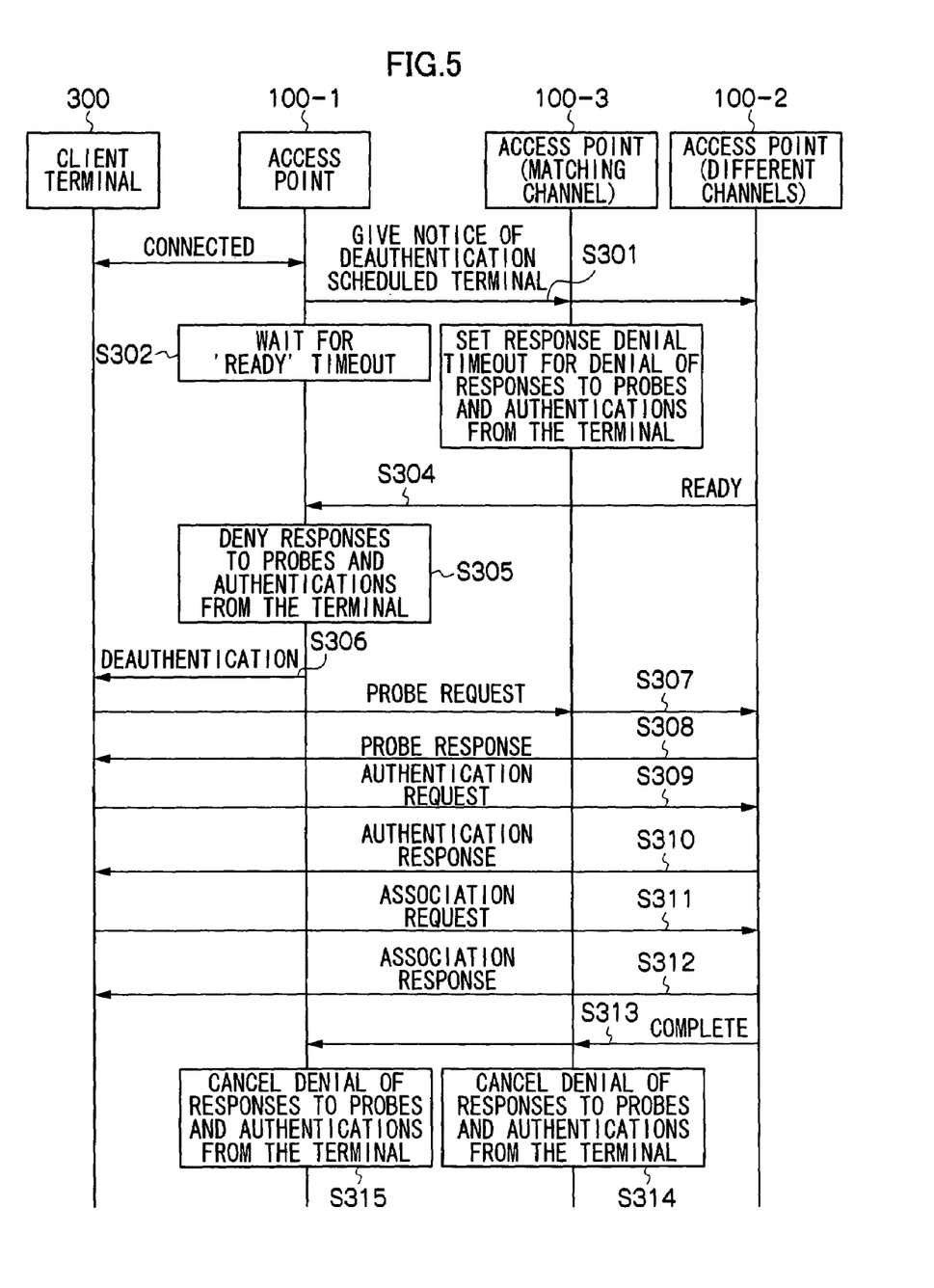
FIG. 5 is a diagram showing a sequence of operations of the network relating to the first embodiment.

In FIG. 5, initially, the access point 100-1 is connected with the client terminal 300.

At the access point 100-1, when it is detected by the employed bandwidth monitoring section 104 that the communication bandwidth of the wireless LAN interface section 101 has exceeded the load balance function commencement threshold, the client terminal 300 to be the object of connection severance is selected by the severance client terminal judgment section 105.

Correspondingly, the load balance message transmission/reception section 106 of the access point 100-1 creates the deauthentication scheduling message which includes the MAC address, the wireless channel and the SSID of the client terminal 300, and transmits the message by broadcasting or multicasting through wired connections (step S301).

Then, the access point 100-1 prepares for reception of a 'ready' message, and is set to waiting for arrival of the 'ready' message from the other access points 100-2 and 100-3 within the timeout time (step S302).

Meanwhile, when the other access points 100-2 and 100-3 receive the deauthentication scheduling message from the access point 100-1, the load balance message transmission/reception section 106 of each checks whether the SSIDs coincide and checks whether the wireless channels coincide.

Then, because the access point 100-3 has a match with the wireless channel at the access point 100-1, the access point 100-3 carries out the processing of step S206 in FIG. 4, and implements a denial of responses to probe request messages and authentication request messages from the particular client terminal 300 (step S303). At this time, the access point 100-3 commences a timer operation.

Meanwhile, the access point 100-2 does not have a match with the wireless channel at the access point 100-1. Therefore, the access point 100-2 carries out the processing of step S208 in FIG. 4, and sends the 'ready' message to set for connection with the particular client terminal 300 (step S304).

At the access point 100-1, when the 'ready' message from the access point 100-2 is received, the access point 100-1 implements a denial of responses to probe request messages and authentication request messages from the particular client terminal 300 (step S305), and sends a deauthentication message to the client terminal 300 (step S306).

Accordingly, the connection of the client terminal 300 with the access point 100-1 is forcibly disconnected, and in order to connect with another of the access points 100, the client terminal 300 sends a probe request message (step S307).

When the access point 100-2 receives the probe request message from the client terminal 300, the access point 100-2 responds thereto with a probe response message (step S308).

Then, when the client terminal 300 sends an authentication request message, which is a request for authentication, the access point 100-2 carries out predetermined authentication processing, and when authentication is achieved, responds with an authentication response message (steps S309 and S310).

When the client terminal 300 sends an association request message, the access point 100-2 responds with an association response message, association is achieved, and processing for connection of the client terminal 300 with the access point 100-2 is complete (steps S311 and S312).

Correspondingly, the access point 100-2 performs the processing of step S210 in FIG. 4, and transmits the 'complete' message by broadcast or multicast (step S313).

When the access points 100-1 and 100-3 receive the 'complete' message from the access point 100-2, the access points 100-1 and 100-3 perform the processing of step S110 in FIG. 3 and step S207 in FIG. 4, and cancel the denials of connection with the client terminal 300 (steps S314 and S315).

(A-3) Effects of the First Embodiment

As described above, according to the first embodiment, when a communication bandwidth of the access point 100 increases, the connection of a client terminal 300 that is selected from among the client terminals 300 that are currently connected can be forcibly cut off.

Furthermore, according to the first embodiment, the access point 100 that acts to execute forcible disconnection of the client terminal 300 can forcibly transfer the client terminal 300 to another access point. Thus, a probability of new communications being commenced can be reduced and an increase in network traffic in the same channel is suppressed, and improvements in both overall usage efficiency of bandwidth of the network system and communication quality can be expected.

Further yet, according to the first embodiment, it is possible for the access points 100 to respond to an increase in real-time communications while efficiently using overall bandwidth of the network.

(B) Other Embodiments (B-1) The embodiment described above has been described with access points (wireless devices) and client terminals (wireless terminals) being employed in conformance with IEEE 802.11. However, it is also possible to broadly apply wireless communication technologies which are not limited to the standards and communication protocols described by IEEE 802.11 or the like.

(B-2) In a case in which there are a plurality of access points available as transfer destinations of a client terminal scheduled for connection severance, which is to say, a case in which there are a plurality of access points which can respond with 'ready' messages in step S208 of FIG. 4, the access point which is severing the connection may determine the access point to be the transfer destination in accordance with an order of arrival of the 'ready' messages.

Moreover, in such a case, for example, priority levels may be set in advance in accordance with communication capabilities of the access points (for example, communication bandwidth capacity or the like), and a transfer destination access point determined in accordance with these priority levels. That is, it is possible to set an access point which has a large communication bandwidth capacity as a priority transfer destination.

(B-3) The embodiment described above has been described with the access points being connectable together via wired connections. However, as long as messages can be sent and received between the access points, wired connection is not a limitation and it is possible to partially or wholly use a wireless network.

In such a case, a client side communication interface section and an access point side wireless interface section may have the same structure. Accordingly, structural sizes of the access points can be made smaller.

(B-4) In the embodiment described above, for convenience of description, structure of the access point 100 has been described as a hardware structure, but in practice may be realized by execution of software.

What is claimed is:

1. A wireless system to be provided to a wireless device of a network, the wireless device connecting with one or more wireless terminals and the network being constituted to include a plurality of the wireless devices, and the wireless system comprising:

a first wireless device, a second wireless device, and a third wireless device, each including
an inter-device communications section which communicates with other wireless devices,
a wireless communications section which communicates wirelessly with each of the wireless terminals, and
a connection controller section which controls the connection of each of the wireless terminals, wherein the first wireless device further includes
an employed bandwidth monitoring section which monitors bandwidth employed by the wireless communications section of the first wireless device,
a connection severance terminal selection section which, if the bandwidth employed by the wireless communications section of the first wireless device exceeds a threshold, selects a connection severance terminal from among the wirelessly connected wireless terminals, and
a connection severance declaration section which, when the connection severance terminal is selected, causes a connection severance declaration signal to be sent to the second wireless device and the third wireless device via the inter-device communications section of the first wireless device, the connection severance declaration signal including identification information, an SSID (Service Set Identifier), and wireless channel information of the connection severance terminal, wherein the second wireless device and the third wireless device each further include an acceptance judgment section which judges whether or not to connect with a connection severance terminal on the basis of the SSID and the wireless channel information within the connection severance terminal information included in a connection severance declaration signal from the first wireless device, which the inter-device communications section of the second wireless device or the third wireless device has received, wherein when the acceptance judgment section of the second wireless device determines that the SSID of the selected connection severance terminal matches with the SSID of the second wireless device, and that the wireless channel information of the selected connection severance terminal matches with the wireless channel information of the second wireless device, and the second wireless device determines not to connect with the selected connection severance terminal, and when the acceptance judgment section of the third wireless device determines that the SSID of the selected connection severance terminal matches with the SSID of the second wireless device, and that the wireless channel information of the selected connection severance terminal differs from the wireless channel information of the third wireless device, and the third wireless device determines to connect with the selected connection severance terminal, the connection controller section of the second wireless device denies a connection request from the connection severance terminal, the connection controller section of the third wireless device transmits a connection preparation signal that indicates connection preparation with the connection severance terminal to the first wireless device, the connection controller section of the first wireless device denies a connection request from the connection severance terminal and transmits a termination signal to the connection severance terminal, the connection controller section of the third wireless device sends a signal of declaration of acceptance of the connection severance terminal to the first and the second wireless devices via the inter-device communications section after a connection process with the connection severance terminal is completed, and the connection controller sections of the first and the second wireless devices cancel the denials of connection requests from the connection severance terminal after the receipt of the signal of declaration of acceptance from an acceptance declaration section of the third wireless device.

2. A wireless device of a network including a plurality of the wireless devices, the wireless device connecting with one or more wireless terminals, the wireless device being included in the wireless system of claim 1.

3. A network comprising a plurality of the wireless devices of claim 2, the wireless device connecting with one or more wireless terminals.

4. The wireless system of claim 1, wherein the connection severance terminal selection section selects, from among the wirelessly connected wireless terminals, a connection severance terminal other than a wireless terminal performing voice communications.

5. The wireless system of claim 1, wherein the connection severance terminal selection section preferentially selects a wireless terminal with the lowest reception strength of electromagnetic waves as a connection severance terminal from among the wirelessly connected wireless terminals.

6. The wireless system of claim 1, wherein the connection severance declaration signal sent from the first second wireless device includes the SSID and a MAC address as the identification information of the connection severance terminal.

7. The wireless system of claim 1, wherein, in the connection controller section of the second wireless device, the connection request from the connection severance terminal is a probe request message or an authentication request message.

8. The wireless system of claim 1, wherein, in the connection controller section of the first wireless device, the connection request from the connection severance terminal is a probe request message or an authentication request message.

9. The wireless system of claim 1, wherein the connection process of the connection controller section of the third wireless device includes:
receiving a probe request message from the connection severance terminal;
sending a probe response message to the connection severance terminal;
receiving an authentication request message from the connection severance terminal;
sending an authentication response message to the connection severance terminal when authentication has succeeded;
receiving an association response message from the connection severance terminal; and
completing the connection process when the association has succeeded.

10. A method for use in a wireless system that includes first, second, and third wireless devices and a plurality of wireless terminals that communicate with the wireless devices, each of the first, second, and third wireless including an inter-device communications section which communicates with the other wireless devices, a wireless communications section which communicates wirelessly with the wireless terminals, and a connection controller section which controls the connection of each of the wireless terminals, the first wireless device further including an employed bandwidth monitoring section which monitors bandwidth employed by the wireless communications section of the first wireless device, a connection severance terminal selection section which, when the bandwidth employed by the wireless communications section of the first wireless device exceeds a threshold, selects a connection severance terminal from among the wirelessly connected wireless terminals, and a connection severance declaration section which, when the connection severance terminal is selected, causes a connection severance declaration signal to be sent to the second and third wireless devices via the inter-device communications section of the first wireless device, the severance declaration signal including identification information, an SSID (Service Set Identifier) and wireless channel information of the connection severance terminal, the second and third wireless devices each further including an acceptance judgment section with judges whether or not to connect with a connection severance terminal on the basis of the SSID and the wireless channel information with the connection severance terminal information included in a connection severance declaration signal from the first wireless device, which the inter-device communications section of the second or third wireless device has received, said method comprising the steps of:
(a) determining whether a first condition is true, the first condition being that the acceptance judgment section of the second wireless device determines that the SSID of the selected connection severance terminal matches with the SSID of the second wireless device and that the wireless channel information of the selected connection severance terminal matches with the wireless channel information of the second wireless device;
(b) determining whether a second condition is true, the second condition being that the acceptance judgment section of the third wireless device determines that the SSID of the selected connection severance terminal matches with the SSID of the second wireless device and that the wireless channel information of the selected connection severance terminal differs from the wireless channel information of the third wireless device and that the third wireless device determines to connect with the selected connection severance terminal;
(c) if the first and second conditions are determined to be true in steps (a) and (b), then conducting the following steps (d) through (h);
(d) denying a connection request from the connection severance terminal, step (d) being conducted by the connection controller section of the second wireless device;
(e) transmitting a connection preparation signal that indicates connection preparation with the connection severance terminal to the first wireless device, step (e) being conducted by the connection controller section of the third wireless device;
(f) denying a connection request from the connection severance terminal and transmitting a termination signal to the connection severance terminal, step (f) being conducted by the connection controller section of the first wireless device;
(g) sending a signal of declaration of acceptance of the connection severance terminal to the first and second wireless devices via the inter-communications section after a connection process with the connection severance terminal is completed, step (g) being conducted by the connection controller section of the third wireless device; and
(h) cancelling the denials of connection requests from the connection severance terminal after the receipt of the signal of declaration of acceptance from an acceptance declaration section of the third wireless device, step (h) being conducted by the connection controller section of the first and second wireless devices.

11. The method of claim 10, further comprising selecting, from among the wirelessly connected wireless terminals, a connection severance terminal other than a wireless terminal performing voice communications.

12. The method of claim 10, further comprising selecting, from among the wirelessly connected wireless terminals, the wirelessly connected wireless terminal with the lowest reception signal strength of electromagnet waves as the connection severance terminal.

13. The method of claim 10, wherein the connection severance declaration signal includes the SSID and a MAC address as the identification information of the connection severance terminal.

14. The method of claim 10, wherein the connection request from the connection severance terminal is a probe request message or an authentication request message.

15. The method of claim 10, further comprising receiving a probe request message from the connection severance terminal, and sending a probe response message to the connection severance terminal.

16. The method of claim 15, further comprising receiving an authentication request message from the connection severance terminal, and sending an authentication response message to the connection severance terminal when authentication has succeeded.

17. The method of claim 16, further comprising receiving an association response message from the connection severance terminal, and completing the connection process when the association has succeeded.

18. An access control device to be provided to a particular wireless device of a network, the particular wireless device communicating with one or more wireless terminals and the network being constituted to include at least one additional wireless device, and the access control device comprising:
an inter-device communications section which communicates with said at least one additional wireless device;

a wireless communications section which communicates wirelessly with the wireless terminals;

an employed bandwidth monitoring section which monitors bandwidth employed by the wireless communications section;

a connection severance terminal selection section which, if the bandwidth employed by the wireless communications section exceeds a threshold and if a plurality of wireless terminals are communication with the particular wireless device, selects a connection severance terminal from among the wirelessly connected wireless terminals;

a connection severance declaration section which, when the connection severance terminal is selected, causes a connection severance declaration message to be sent to other wireless terminals via the inter-device communications section, the connection severance declaration message including information about the connection severance terminal; and a forcible severance instruction section which verifies reception, via the inter-device communications section, of a message of declaration of acceptance of the connection severance terminal from another of the said at least one additional wireless device, and causes a forcible severance instruction message to be sent to the connection severance terminal.

* * * * *